(No Model.) 3 Sheets—Sheet 2.
J. W. T. OLÁN.
ELECTRIC BATTERY.
No. 553,719. Patented Jan. 28, 1896.
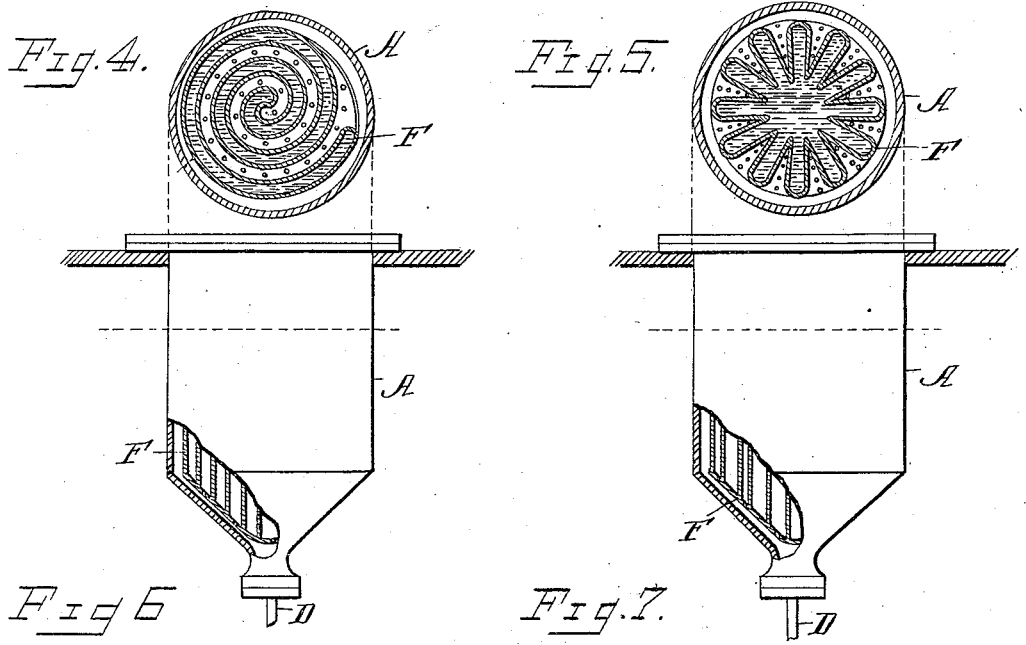
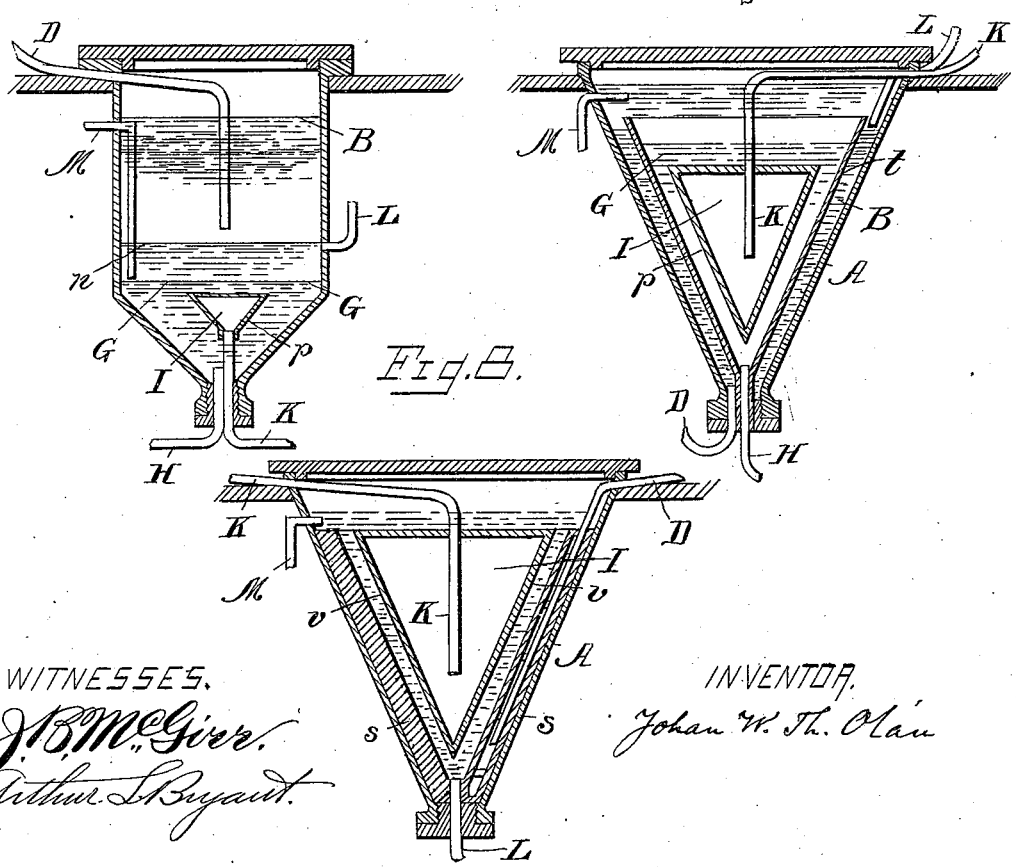
WITNESSES.
J. B. McGiver.
Arthur L. Bryant.
INVENTOR.
Johan W. Th. Olán

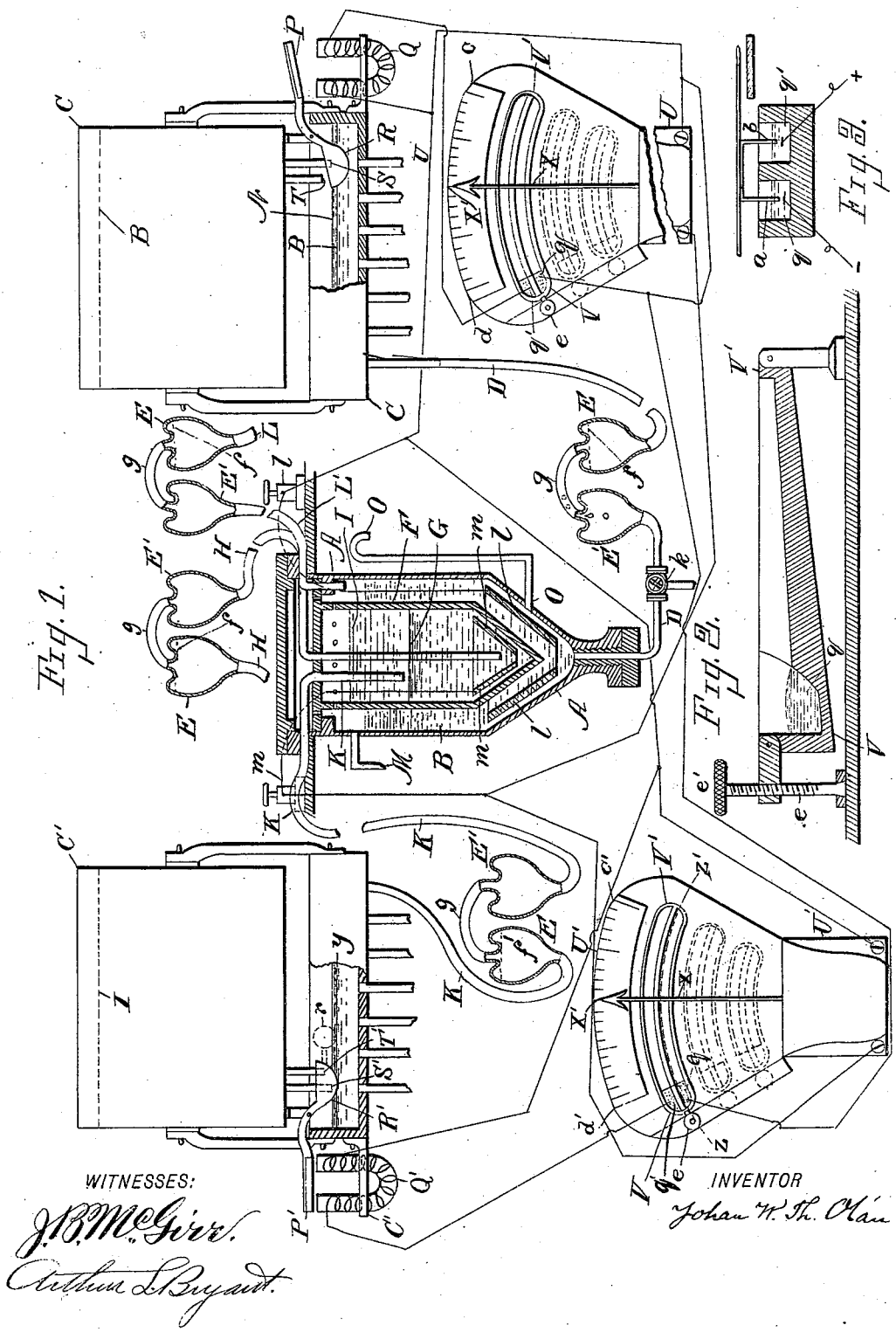

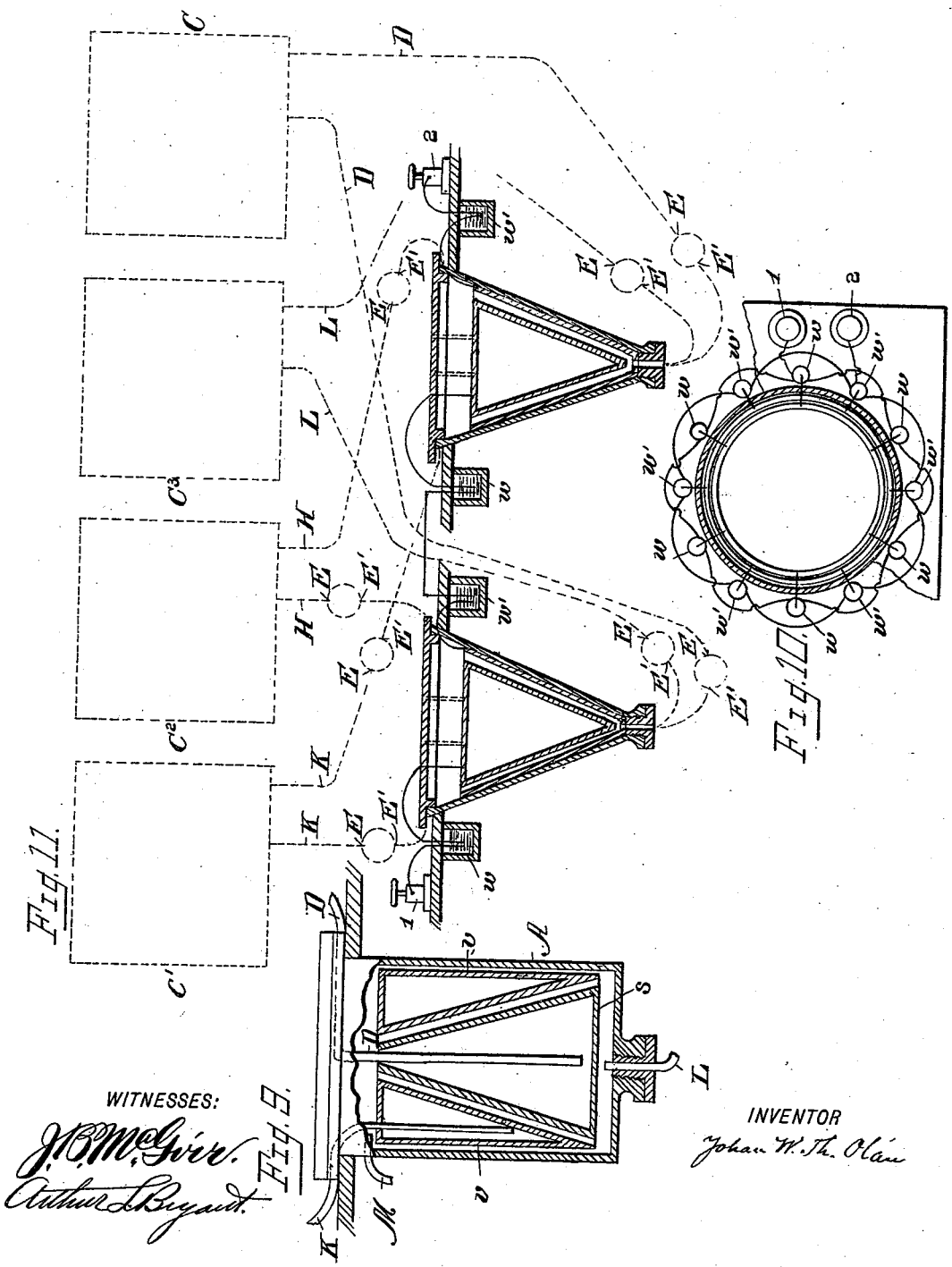

UNITED STATES PATENT OFFICE.

JOHAN W. TH. OLAN, OF NEW YORK, N. Y.

ELECTRIC BATTERY.

SPECIFICATION forming part of Letters Patent No. 553,719, dated January 28, 1896.

Application filed August 5, 1892. Serial No. 442,276. (No model.)

*To all whom it may concern:*

Be it known that I, JOHAN W. TH. OLAN, a subject of the King of Sweden and Norway, and a resident of New York, in the county of New York and State of New York, have invented certain new and useful Improvements in Electric Batteries, of which the following is a specification.

My invention relates to apparatus for producing an electric current by means of chemical reaction, such apparatus being known under the name of "chemical electric batteries," "primary electric batteries," &c. The chief inconveniences connected with said apparatus up to the present time have been the following: first, the great expense connected with their use where any considerable amount of current is required, such expense being due not only to the cost of the materials themselves, (used in the batteries,) but perhaps still more to the generally considerable waste of said materials when the batteries are not in use and to the great amount of work and labor which has to be expended for keeping them in working order; second, the comparatively low combining power of the elements whereof the batteries have heretofore been composed, which necessitates employment of a great number of elements connected in series where a current of considerable tension is required, with all the complications resulting therefrom, such as faulty connections, unreliability, &c.; third, the gradually-lessening strength and capacity of the batteries while being used, due not only to the increasing polarization of their poles, but also to the diminishing strength of their solutions, the lessening of their pole-surfaces, &c.; fourth, the great weight and usually the great space they require per unit of current produced.

The object of my present invention is to produce a battery wherein not only most of the aforesaid inconveniences are totally absent, but also wherein the others are reduced to a practical minimum.

My object is furthermore to produce a battery which not only in economical usefulness and practical adaptability will stand competition with the other electrical sources in use at the present time, but which also in many cases will show advantage over them.

My object is in brief to produce a powerful, reliable, perfectly constant, easily manageable and comparatively light and independent source of electric current, and which furthermore without appreciable increase of cost per unit of output can be adjusted for any required tension and quantity of current within the limit of its capacity, and which can be used with advantage not only where at present mechanical arrangements for the same purpose are used without great inconvenience, but also and with still more advantage in cases where said mechanical arrangements prove most inconvenient—for instance, for purposes of locomotion, for lighting purposes in country places and remotely-situated buildings, &c.

In carrying out my invention I have attained the aforesaid objects by the following means:

I have obtained great power and capacity for my battery by improved means for producing the intense chemical reaction necessary for the purpose. Instead of zinc and other metals of comparatively low chemical equivalency, which generally are used as positive poles in batteries of to-day, I use either singly or in combination with each other or with other metals or elements the metals of the alkalies or of the alkaline earths—for instance, sodium, potassium, lithium, magnesium, calcium, &c.—in brief, that large group of elements or conducting combinations thereof, also organo-metallic bodies, which in contact with pure water will at ordinary (atmospheric) temperature decompose the latter and thereby become oxidized, combining with the oxygen from the water according to the nature of the element or the combination. To make the intense chemical reaction from said substances work by degrees and within practical limits I either use them mixed or in combination with other metals or substances of less reactive power, or I surround the positive pole in question with conducting fluids or substances conveniently poor in negative elements or their combinations, or I provide other means for a gradual and limited reaction. As negative pole, I use a metal or conducting substance of pronounced electronegative quality in connection with substances rich in electronegative elements, such as peroxide of hydrogen and other peroxides, combinations of oxygen with chlorine, bromine and iodine, or combinations of these latter with each other; further, solutions of salts rich in negative elements, &c., which will all serve not only as depolarizing material, but will also continually supply the battery solution or the interposed medium between the poles with the necessary negative elements.

In this way I have arrived at a great intensity of the element, and what is lost by arrangements for limiting the chemical reaction is gained in time by the longer duration of said reaction. By improved connections and an improved construction and combination of parts it has been made reliable.

By continuous and automatic supply and by automatic regulation of the tension, as well as of the quantity of the current the battery has been made constant. By its automatic operation and its improved means of supply it has been made easily manageable, and by regulating the supply according to the tension or quantity of current needed unnecessary waste of materials has been avoided, and the cost for a given current has been brought into accord with the current produced.

My invention consists in the improved battery and the novel or improved parts and combinations thereof hereinbefore mentioned and hereinafter specified and claimed.

To illustrate my invention I hereby refer to the accompanying drawings, wherein—

Figure 1 is a view, partly in section, of one element of the battery and its means for automatic adjustable supply, automatic regulation of the tension and quantity of the current, &c. Fig. 2 is a section on the line $z\ z'$ of Fig. 1. Fig. 3 is a partial section on the needle $x\ x'$ of Fig. 1. Figs. 4, 5, 6, 7, 8, and 9 show different forms for elements of the battery. Fig. 10 shows means for connecting the poles of an element with the termini thereof. Fig. 11 shows a means for uninterrupted supply to the different elements from a single source without making a short circuit between the elements when connected in series.

Referring to the letters and numerals of said figures, A, Fig., 1 is a vessel of glass or other suitable material into which a fluid composition B, with alkali metals, &c.—for instance, mercury with sodium, potassium, lithium, &c.—is supplied from the supply apparatus C through the tubing D and the interposed vessel E E'.

F is a vessel of porous clay or other suitable material supplied in similar manner with a liquid composition G, of negative metals or substances—for instance, mercury with a certain percentage of antimony, selenium, phosphorous and bismuth—from the supply-conduit H, and with depolarizing fluid I from the supply-conduit K—for instance, acidulated water with peroxide of hydrogen, &c.

L is a fourth supply-conduit for pure or acidulated water, and M is an outlet for the used-up materials.

N is a suitable protecting fluid—for instance, oil—that may be used at the top of the positive composition B in the lower part of the supply apparatus C.

When the battery is to be used, the supply-vessels are raised or lifted to the requisite height by suitable means in proper order so as to make the active materials enter the battery, after which the chemical reaction takes place through the porous wall of the clay vessel F. The depolarizing solution and of course to some extent the solution supplied from L penetrates and moistens the porous-clay vessel. The alkali-metal composition on its outside is oxidized by the oxygen of the decomposed water, while the hydrogen tends to combine with the negative elements inside the clay vessel. It is, however, there continuously again oxidized by the depolarizing solution into water, which again together with the depolarizing solution will enter the porous-clay wall, whereupon the aforesaid chemical reaction again takes place. The alkali hydrate formed outside the clay vessel will float to the top of the composition B, where it will be dissolved by the water-supply and carried away through the outlet M. As now in this way the alkali metals by degrees are used up in the composition B, which has entered the battery at the same time the depolarizing solution grows poorer in negative element, the continuous and automatic supply will keep the chemical reaction at normal intensity. It is, however, evident that when mercury with alkali metals is thus continuously supplied to the battery but only the alkali metal is used up, the percentage of mercury in the battery will increase until the composition has become so poor in said metals that mercury has to be carried away if the reaction is to be kept normal. This will also be the consequence of the supply arrangements, as the level of the composition in the element then will reach outlet M, whereafter mercury will escape through M into a suitable receiver. As the mercury having become impoverished in alkali metals has a tendency to sink to the bottom, it may, however, prove preferable where the layer of composition in question has a certain thickness to arrange the outlet for the mercury at a point lower down—for instance, through the tube O—from which it then can be run into a protecting liquid, which will prevent what still remains of the alkali metals from oxidation.

After these necessary theoretical remarks as to the chemical reaction, &c., in the battery, the working of the automatic and adjustable supply arrangements are now to be illustrated. By the chemical reaction in the battery the intended electric current is produced. As soon as said current is of the necessary quantity, the armature P will be attracted by the electromagnet Q, whereby the vessel R will be turned horizontal, like R', and the outlet S T of the supply apparatus C will be closed. Should said quantity of current lessen, the armature will not be attracted, as the magnet then will cease to work, the vessel R will take the position shown, the outlet for the supply composition will be reopened, the level of B heightened in the lower part of the apparatus C, whereby the level of said composition will rise in the battery in a corresponding degree, thus offering a larger surface for the reaction which will cause the quantity of the current to increase. To effectuate this and for enabling the adjustment of the current to any quantity desired within the limits of the capacity of the battery, arrangements are made to make the electromagnet Q depend on the movements of the pointer of one ammeter U. Figs. 1, 2, and 3 show this arrangement. The pointer of said ammeter moves over the scale of said instrument.

V V' is a double vessel underneath the needle. The two compartments thereof are electrically insulated from each other. In each of said compartments is a quantity of mercury $q\ q'$, into each of which respectively is introduced a terminal of a circuit which energizes the electromagnet Q. If therefore these two bodies of mercury in some way are connected, said circuit becomes complete, the magnet acts in aforesaid way and the supply-outlet becomes closed. If the connection ceases, the magnet ceases to work and the supply-outlet opens.

Now the ampère-needle carries a metal wire (platinum) whose ends $a$ and $b$ extend downwardly into said two compartments respectively and can be made to effect the aforesaid connection at any position taken by the needle. When no current is on, the end of the ammeter-needle is at $c$; but as the electric current increases the needle moves gradually toward $d$. Suppose now the needle reads on the scale ten ampères, and I want the supply of the battery adjusted for that amount of current. By adjusting the screw $e$ I raise the end V of the double vessel until the mercury has run far enough toward V' to come in contact with the two ends $a$ and $b$, carried by the needle as it reads said ten ampères. The circuit of the electromagnet now being complete, the magnet becomes energized and the supply-outlet becomes closed. Should now the current lessen, the needle will turn toward $c$ again, the ends of the metal wire $a\ b$ will leave the mercury, and as the circuit of the magnet is thereby cut off the magnet will be de-energized, the supply-outlet will be reopened, the fluid-metal level in the battery will rise until the current has increased sufficiently to move the needle back to the point where the metal ends $a$ and $b$ will make contact with the mercury, which according to the adjustment made will happen when the needle reads ten ampères, and which, as shown before, will have as a consequence the closing of the supply-outlet, &c.

It needs no further demonstration that by the aforesaid arrangements means are provided for a prompt and sensitive perfectly automatic and perfectly adjustable supply according to the quantity of current required. The needle can of course by proper means be fixed for purposes of adjustment in any position so as to read any amount of ampères within the limits of the capacity of the battery, and if then the mercury-vessel is adjusted so that contact will just be formed between the bodies of mercury and the ends $a$ and $b$ when the needle afterward is released to move independently the supply-outlet will not be shut until the needle shows the same amount of ampèrage or has reached the same position at which the adjustment was made. In like manner the supply of the battery from each of the other supply-vessels is made automatic and adjustable, and as the attaching of one or several similarly-working metal wires, like $a\ b$, can be made just as well to the needle of the voltmeter U', as described, with reference to the ammeter-needle, whereby, for instance, the supply of the depolarizer can be made dependent on variations of tension in such a way that lessened tension of the battery will cause increased depolarization and thereby increased tension, it is evident that means are provided to make the supply of the battery work automatically with reference to the tension as well as the quantity of current, and that the battery therefore can be adjusted to keep constant for any quantity or tension of current within the limits of its capacity. Similar effect will of course be produced by making the supply of unpolarized quantities of the negative pole, when said pole is liquid, depending on the movements of the needle of U'. Similar effect can even so be produced by making the supply of the electrolyte depending on said movements, as thereby larger and unpolarized parts of the negative pole (when solid) can be brought into action.

As shown on the drawings and made evident by the description, the upper tank or apparatus C is entirely closed, except by the outlets S and T. The lower tank of said apparatus is, on the contrary, open at the top, as plainly shown. The vessel R does not necessarily dip into the liquid of the lower tank of C, as the level of said liquid varies in accord with the proper adjustment of the relative height between apparatus C and the elements of the battery. R is pivoted, as shown, and not fully counterbalanced by P, so as not to take horizontal position except when the magnet Q is active. The level of the liquid in vessel R cannot very well be shown, as it varies with reference to various moments of the operation of the apparatus.

By adjusting one supply so as to work before another the supplies from the different supply-vessels are to be admitted in the order practice and experience will prove convenient for one purpose or another.

It is evident from the construction of the supply-vessels that the atmospheric pressure will prevent the supply fluids from escaping from their respective vessels as long as the vessels R R', &c., have a horizontal position, as shown, with reference to R', but when by degrees the fluids are being consumed in the battery and the quantity or tension of current whereon the supply-outlets respectively depend tend to lessen, then the respective outlets will be reopened, a quantity of air or protecting liquid N will enter through the shorter tube-openings T T', &c., while a corresponding quantity of liquid will run out of the supply-vessels until the respective fluids of the battery have again become normal.

In order to allow me to charge any quantity of elements of a battery from the same supply-vessel without making short circuit between said elements the apparatus E E' has been introduced into all of the supply-conduits. Said apparatus is made of glass or other suitable insulating material. Before charging the elements at all air or another suitable insulating-gas or a neutral insulating liquid is introduced into this apparatus. It will be understood from the form of the apparatus that said gas or liquid being lighter than each one of the supply fluids will partly permanently remain in the apparatus, thereby serving as an interposed insulator of the supply-conduit which at the same time allows continuous supply. When the supply liquid from the supply-vessel enters the apparatus, it will rise to the level $f$, thereby pressing the beforesaid gas or liquid into the other part, E', of the apparatus. Having afterward entered the tube $g$ and reached the highest point thereof, it cannot come any farther without changing place with the lighter gas or fluid. In this way, as the recesses $f'$ will prevent the liquid to follow by adhesion the wall of E, it will by drops fall down through the gas or fluid to the lower part of the part E', whereafter it will uninterruptedly continue on its way to the battery. In this way, although the supply from the supply-vessel is uninterrupted, there will not exist any electrical connection between the elements of the battery and the supply-vessels, and said elements, although all supplied from a few supply-vessels, can therefore be connected in series in the usual way.

It is evident that by lowering the supply-vessels lower than the lowest part of the battery the different fluent compositions and liquids of said battery can be returned to their respective supply-vessels when the battery is not to be used, and for facilitating this it is preferable in practice to locate the supply-entrances at the bottom of the elements where it conveniently can be done or else where said entrances are located from above to let the ends of the respective supply-conduits within the elements dip as deep as possible in their respective fluids. By lowering the respective supply-vessels in proper order, one by one, the different fluids will then easily be returned to their respective supply-vessels until the battery has again to be used. Outlet-cocks like $k$ may also be arranged in the supply-conduit, which will prove advantageous should it for cleaning purposes or other reasons prove necessary to empty separately either the elements or the supply-conduits.

It is evident from the construction of the battery that as no unscrewing of pole-plates or termini will be necessary for keeping it in working order its poles will always prove perfect as they are plunged down into and entirely surrounded by their respective liquid-metal compositions, and therefore an excellent electrical contact is secured.

Having now made a detailed description of the construction and working of my battery as illustrated by Figs. 1, 2, and 3, it remains to make some supplementary remarks with reference to the remaining illustrations.

Fig. 4 represents a variation of my battery where the porous-clay vessel represented by F, Fig. 1, has been given the spiral shape shown in this figure for the purpose of offering a larger surface for the chemical reaction previously described. In other respects the arrangement is similar to that shown in Fig. 1. Fig. 5 represents another variation where said clay vessel F, for the same purpose as just mentioned with reference to Fig. 4, has been given the form illustrated.

Fig. 6, again, is another variation working upon the same generic principle as the others; but in this case the porous vessel between the positive and the negative metal compositions has been left out. The liquid positive metal composition contains only sodium and potassium, or those two in connection with lithium, in proportions to make an alloy fluid at ordinary temperatures and which is also of less specific weight than water. The layer B represents this composition. It swims on the top of the layer $n$, which, being a liquid poor in negative elements—for instance, glycerine with a suitable percentage of (acidulated) water, or another liquid combination of the same quality—will keep the chemical reaction of the element within practical limits. Tube D represents here the supply-conduit for the alkali-metal composition; tube L, the supply-conduit for the glycerine, water, &c., and tube H, for the negative-metal composition G. Tube K, which in this case extends into a porous vessel $p$, of clay or metal or other suitable material, surrounded by the negative-metal composition G, represents the supply-conduit for the depolarizing solution T. The depolarizing reaction will here take place within the limits of the negative-metal composition and the depolarizing solution will not come into immediate contact with the solution $n$, whose glycerine then should be oxidized. The used-up materials pass in this case through the outlet M. The layer $n$ may in this case be kept at constant level by making the movement of the cup R', as indicated in Fig. 1, depend on a swimmer $r$ on the surface of the respective liquids, which closes the outlet when the surface of B has reached the height of M. The other supplies are to be regulated in the hereinbefore-described manner.

Fig. 7 represents another variation where the positive composition B and the negative G enter respectively through the tubes D and H, having between them the porous funnel of clay or other suitable material $t$. L is the entrance for the interposed solution, which may be rich in negative element, (acidulated water, diluted acid, &c.,) as the positive alkali-metal composition in this case is again a fluent alloy with mercury, as hereinbefore mentioned. K represents the end of the supply-conduit for the depolarizing solution entering into a similar porous-clay or metal vessel $p$, as already described by Fig. 6 and with the same purpose in view. M is the outlet.

Fig. 8 represents a variation of the battery in which the fluid positive and negative metal compositions have been replaced with solid metals or alloys. The funnel-shaped part $s$ replaces the positive-fluid composition. It may be solid, as shown to left of the figure, and is then to be composed to a large extent of alkali metals, sodium, potassium, and lithium, together with other positive but less reactive metals—for instance, tin, lead, aluminium, magnesium, beryllium, &c.—which may lessen the intensity of the chemical reaction. Another very advantageous alloy whereof it may be composed is mercury together with sodium, potassium and lithium, those latter metals in large proportions, but an outlet and a suitable cavity is then to be provided for the mercury at the bottom as this runs down in fluent form from the surface of the solid mass as the alkali metals therein are used up. This cavity and outlet will then prevent a short circuit between the two poles. The part $s$ may also be hollow, as shown to the right of the figure, and may then, by continuous supply in the manner hereinbefore described, receive into its interior a fluent composition of sodium, potassium, lithium, or organo-metallic bodies. The wall of $s$ must in this case be porous, whereby the chemical reaction between the battery solution and said positive substances will take place through or within said wall. In order to make the wall porous, as described, the part $s$ is in this case made from tin, lead, or other suitable metal, together with a certain percentage of alkali metal. When founded and cold, the part may be used directly as positive pole in the battery, whereby the alkali metal will dissolve and a porous skeleton of said part remain adapted to receive positive supply liquid or allow the aforesaid chemical reaction through its porous wall.

The part $v$ represents the negative-metal composition and is made from pronounced negative metals—antimony, copper, bismuth—and is made porous by the addition to the alloy of a percentage of alkali metal, which will dissolve when the parts are made to form positive poles in water or a weak acid solution. A skeleton of the other metals will remain, which now may be used as negative pole in the battery and serve at the same time as a receptacle for the supply of the depolarizing solution, allowing the reaction of the same through or within its porous wall. Instead of metals or alloys thereof, any suitable porous and negative conductor can of course be used as the negative pole—for instance, carbon—formed so as to serve as a receptacle for the depolarizing supply. The two pole parts are here, as in all other cases where the distance does not directly follow from the construction, kept apart from each other by proper means, preferably by suitably attaching the upper part to the cover of the battery, &c. In this variation of the battery there may be used as medium between the pole a solution richer in negative element—for instance, acidulated water, diluted acids or conducting salt solutions. It is easily understood that by adjusting the level of the interposed solution the quantity of the current can be regulated, as the poles thereby will submerge more or less therein, thus offering larger surface for the chemical reaction.

Fig. 9 is a variation of the battery working upon the same principle and by the same means as the one hereinbefore last described, but with different shape and position of its pole parts. $s$ is a porous metallic receptacle for positive supply material forming the positive pole. $v$ is negative pole and receptacle for the supply of the depolarizing solution. The acidulated water, &c., enters at L. M is the exit. Where very large pole-surfaces within a limited space are required, the opposed surfaces of the two pole parts are to be provided with folds similar to those shown at F, Fig. 5.

In Figs. 10 and 11 are shown means for an absolute and quick way of connecting the pole parts of a battery with their respective main terminals, in cases where as positive pole is used a solid alloy with alkali metals, and therefore has to be replaced since said metals therein have been consumed. $w$ and $w'$ are all cups or receptacles containing mercury and electrically insulated from each other. In every other one of them dip pole ends from the same pole and every other one is also connected to the same main terminal 1 or 2 of the battery. On exchanging the positive pole the cover with the attached negative pole is lifted up, the positive part afterward replaced with a fresh one, the negative pole again put on place and the battery is again ready for work, since the operation was made without interfering either with the main terminal or with the arrangement for the connection in series, &c., of the battery. Fig. 11 illustrates, furthermore, how the elements of the battery although supplied from the same sources are electrically insulated, and may be arranged in series. C, C', C² and C³ represent the different supply-vessels; D, K, H and L, their respective conduits with the apparatus E E', Fig. 1.

By following the supply-conduits from one battery element to another, it will be seen that one always must pass two apparatus E E', which are insulators, and a short circuit can therefore not arise by the way of the supply-conduit. 1 and 2 are the respective main terminals connected in series.

The electrolyte employed when the positive pole contains an alkaline-earth metal or metals should be of such a character as to form soluble alkaline-earth salts—as, for instance, chlorides—in order that an insoluble incasing crust or layer may not be formed upon the said pole to interfere with proper galvanic action.

The advantages of employing liquid electrodes are manifold. Thus they are readily adapted for automatic supply to the battery; they are brought into shifting circulation by the chemical changes taking place in the battery, so as to constantly expose new surfaces to the electrolyte and to lessen polarization; they can spread out over the entire surface of the electrolyte and if of lesser specific gravity can float thereon, thereby entirely dispensing with the necessity of a dividing partition or container.

I do not claim herein broadly an electrode consisting of an alloy of metals of the alkalies, said alloy being liquid at ordinary temperatures, for the reason that I have filed a divisional application therefor, bearing date of January 4, 1896.

Having now described my invention, what I claim is the following:

1. The combination with an electric battery, of a source of supply of consumable material therefor, an electromagnet governing said supply, an instrument responding to variations of tension located in multiple arc to the battery-circuit, and a circuit-breaker for the electromagnet actuated by said instrument, said circuit-breaker having adjustable liquid terminals whereby the tension of the battery-circuit will be automatically maintained; substantially as described.

2. The combination with an electric battery, of separate sources of consumable material therefor, the supply from each source being governed by a separate electromagnet, instruments responding to variations in tension and quantity located in the battery-circuit, and a separate circuit-breaker for each electromagnet, said circuit-breaker being actuated by said instruments respectively; whereby the battery may be maintained constant both as to tension and quantity, substantially as described.

3. The combination with a battery, of a supply-vessel therefor, a magnet governing the outflow from said vessel, adjustable liquid metallic terminals for the magnet-circuit, an instrument in the battery-circuit having a movable armature, and a connector actuated by the armature for joining said terminals at a predetermined period in the movement of said armature; substantially as described.

4. The combination with a battery, of a supply-vessel therefor, a magnet governing the outflow from said vessel, an instrument in the battery-circuit responding to variations in the battery-current, a holder pivoted at one end and having means of raising or lowering it at the other end, said holder being provided with two separate compartments containing conducting liquids constituting liquid terminals for the circuit of the electromagneto and a double-ended connector carried by a moving part of the instrument and adapted to complete or break connection between said liquid terminals according to the location of said moving part; substantially as described.

5. The combination with an electric battery, of a conduit for supplying consumable material thereto, said conduit being provided with two chambers containing air or some other insulating fluid, and the portion of the conduit-pipe which connects said chambers opening into the chambers at a point below the upper surface thereof; whereby on the passage of liquid through the conduit, a portion of the insulating fluid will remain in one of the chambers, and the supply liquid will pass through the insulating fluid in the form of drops, substantially as described.

6. The combination with a battery, of a supply-reservoir for furnishing liquid-consumable material thereto, an entirely-closed supply-conduit extending from the reservoir to the battery, and an insulating fluid interposed in a portion of said inclosed supply-conduit; substantially as described.

7. The combination with an electric battery, of an entirely-closed liquid-supply conduit therefor, said supply-conduit being provided with a chamber containing an insulating fluid, and means for breaking up the liquid supply into drops in passing through said insulating fluid; substantially as described.

8. In an electric battery, a positive electrode, consisting of a porous conducting-receptacle containing substances not less electropositive than beryllium; substantially as described.

9. In an electric battery, a liquid positive electrode, consisting in part of metals of the alkaline earths; substantially as described.

10. In an electric battery, a positive pole consisting of a metallic electrode of metals whose oxides dissolved in water give an alkaline reaction in combination with aluminium; substantially as described.

11. In an electric battery, a negative electrode, consisting of mercury in molecular and chemical combination with a substance adapted to form a non-gaseous combination with hydrogen; substantially as described.

12. In an electric battery, a liquid negative pole in combination with a depolarizer located within said pole; substantially as described.

13. In an electric battery, a liquid negative pole in combination with a depolarizer located within said pole; said depolarizer being rich in oxygen; substantially as described.

14. In an electric battery, a liquid negative pole in combination with a depolarizer located within said pole, said depolarizer being rich in oxygen and metalloids of the halogen group; substantially as described.

15. An electric battery, having its positive pole composed of metal not less electropositive than beryllium, in combination with substances for moderating the action, a negative pole consisting of mercury in combination with substances adapted to form with hydrogen non-gaseous compounds and an electrolyte between the poles; substantially as described.

16. An electric battery, having its positive pole composed of metal not less electropositive than beryllium, in combination with substances for moderating the action, a negative pole consisting of mercury in combination with substances adapted to form with hydrogen non-gaseous combinations, and a solution rich in oxidizing elements, (oxygen and metalloids of the halogen group) in electrolytic communication therewith, and an electrolytically-active medium between the poles; substantially as described.

17. The method of manufacturing a porous pole for an electric battery, which consists in submerging an alloy, containing an alkali metal, in a weak conducting solution and dissolving out the alkali metal only whereupon there will remain a spongy or porous conducting skeleton; substantially as described.

18. The method of manufacturing a porous pole for an electric battery, which consists in submerging an alloy, containing an alkali metal, in a weak conducting solution, and passing through said solution an electric current, while employing the alloy as a positive pole, until the alkali metal only is dissolved out, leaving a spongy or porous conducting skeleton; substantially as described.

19. The combination in an electric battery of a vessel adapted to contain a solution, a porous conductor adapted to serve as a receptacle for and containing a positive liquid composition, the same serving as positive pole of the battery, another porous conductor adapted to serve as a receptacle for and containing a liquid rich in negative elements (such as oxygen, chlorine, bromine and iodine or their respective or mutual combinations) the same forming the negative pole, a conducting electrolytically-active intermedium interposed between said poles and means provided for outside connection for said poles, substantially as described.

20. The combination, in an electric battery, of a vessel adapted to contain a solution, a porous metal adapted to serve as a receptacle for and containing a positive liquid composition, the same serving as positive pole of the battery, another porous metal adapted to serve as a receptacle for containing liquid rich in negative elements (such as oxygen, chlorine, bromine and iodine, or their respective or mutual combinations), the same forming the negative pole, a conducting electrolytically-active intermedium interposed between said poles, and means provided for outside connection for said poles, substantially as described.

21. The combination in an electric battery, of a vessel adapted to contain a solution, a composition of metals in combination with conductors so as to form and complete the positive pole; a composition of negative elements in combination with conductors so as to form and complete the negative pole, a liquid or humid and conducting substance between said poles, said substance being adapted to intermediate a chemical reaction between said poles; outlets for the used-up materials, a depolarizing substance reacting chiefly upon the negative pole, automatic supply arrangements for continuous supply of the active or reactive liquid materials used within the battery, said supply arrangements provided with an electrically-insulating conduit electrically separating the battery or element from the supply source, said supply arrangements also electromechanically governed by or depending on the electric current produced, in the battery, substantially as described.

22. The combination, in an electric battery, of a vessel adapted to contain a solution, a composition of positive substances which at ordinary atmospheric temperature will decompose pure water, in combination with metals so as to form and complete the positive pole; a composition of negative elements in combination with conductors so as to form and complete the negative pole, an electrolytically-active substance between said poles, said substance being adapted to intermediate a chemical reaction between said poles; outlets for the used-up materials, a depolarizing substance reacting chiefly within the negative pole, automatic supply arrangements for continuous supply of the active or reactive liquid materials used within the battery, said supply arrangements provided with an electrically-insulating conduit electrically separating the battery or element from the supply source, said supply arrangements also electromechanically governed by or depending on the electric current produced in the battery, substantially as described.

23. An electric battery having a liquid electrolyte and having both of its electrodes formed of metallic liquids, (the positive whereof has a specific gravity less than the liquid electrolyte;) substantially as described.

24. An electric battery having both of its electrodes as well as the electrolyte between said electrodes consisting of liquids, and means for automatically supplying said liquids to the battery; substantially as described.

25. In an electric battery, a negative electrode consisting of a metal in part molecularly and in part chemically combined with a solid substance adapted to form a non-gaseous combination with hydrogen; substantially as described.

26. In an electric battery, the combination with the positive and negative electrodes, the one entirely inclosing the other, and constituting a containing-vessel for the electrolyte, an electrolyte entirely contained within said vessel, and means to regulate the level of the electrolyte so as to vary the current produced; substantially as described.

27. An electric battery having one pole of funnel shape and the other pole also of funnel shape and inclosed within the former, an electrolyte, and means for automatically varying the current produced by regulating the level of the electrolyte; substantially as described.

28. In an electric battery, a positive pole consisting of a metallic electrode comprising metals of the alkalies and alkaline earths; substantially as described.

29. In an electric battery, a positive pole comprising metals of the alkalies and alkaline earths with aluminum; substantially as described.

30. In an electric battery, a positive pole comprising metals of the alkalies and alkaline earths with other highly-positive metals; substantially as described.

31. In an electric battery, a positive pole containing metals of the alkaline earths; substantially as described.

32. In an electric battery, a positive pole comprising metals of the alkaline earths with mercury; substantially as described.

33. In an electric battery, a positive pole comprising metals of the alkaline earths with aluminium; substantially as described.

34. In an electric battery, the combination with a liquid positive electrode, of a conducting-receptacle therefor, consisting of a porous metallic skeleton, substantially as described.

Signed at Washington, in the District of Columbia, this 5th day of August, A. D. 1892.

JOHAN W. TH. OLAN.

Witnesses:
  JOS. FORREST,
  T. H. BROWN.